(12) United States Patent
Elnozahy et al.

(10) Patent No.: US 8,650,554 B2
(45) Date of Patent: Feb. 11, 2014

(54) SINGLE THREAD PERFORMANCE IN AN IN-ORDER MULTI-THREADED PROCESSOR

(75) Inventors: Elmootazbellah N. Elnozahy, Austin, TX (US); Ahmed Gheith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 12/767,886

(22) Filed: Apr. 27, 2010

(65) Prior Publication Data

US 2011/0265068 A1    Oct. 27, 2011

(51) Int. Cl.
G06F 9/44    (2006.01)
G06F 9/45    (2006.01)

(52) U.S. Cl.
USPC ........... 717/149; 717/100; 717/136; 717/140; 717/141; 717/146; 717/148

(58) Field of Classification Search
USPC .......... 717/149, 100, 136, 140, 141, 146, 148
See application file for complete search history.

(56) References Cited

U.S. PATENT DOCUMENTS

| | | | |
|---|---|---|---|
| 6,928,645 B2 | 8/2005 | Wang et al. | |
| 7,010,787 B2 * | 3/2006 | Sakai | 717/159 |
| 7,386,864 B2 * | 6/2008 | Richardson | 719/321 |
| 8,205,204 B2 * | 6/2012 | Shoemaker et al. | 718/102 |
| 8,234,635 B2 * | 7/2012 | Isshiki et al. | 717/149 |
| 8,443,351 B2 * | 5/2013 | Haselden et al. | 717/150 |
| 2004/0103410 A1 * | 5/2004 | Sakai | 717/146 |
| 2007/0113055 A1 | 5/2007 | Dale et al. | |
| 2007/0130568 A1 * | 6/2007 | Jung et al. | 718/104 |
| 2008/0201563 A1 | 8/2008 | Dale et al. | |
| 2008/0250231 A1 * | 10/2008 | Tagawa et al. | 712/220 |
| 2009/0125882 A1 * | 5/2009 | Frigo et al. | 717/116 |
| 2009/0144525 A1 * | 6/2009 | Shoemaker et al. | 712/200 |
| 2010/0005277 A1 | 1/2010 | Gibert et al. | |
| 2011/0067016 A1 * | 3/2011 | Mizrachi et al. | 717/149 |

OTHER PUBLICATIONS

Boneti, et al., "Software-Controlled Priority Characterization of POWER5 Processor", ACM Digital Library/IEEE, 2008, pp. 415-426.
Oehmke, David W. et al., "How to Fake 1000 Registers", Inspec/IEEE, 2005, 12 pages.
Woo, Dong H. et al., "Chameleon: Virtualizing Idle Acceleration Cores of A Heterogeneous Multicore Processor for Caching and Prefetching", ACM Digital Library, vol. 7, No. 1, Apr. 2010, 35 pages.

* cited by examiner

Primary Examiner — Idriss N Alrobaye
Assistant Examiner — Getente A Yimer
(74) Attorney, Agent, or Firm — Stephen R. Tkacs; Stephen J. Walder, Jr.; Eustus D. Nelson (57) ABSTRACT

A mechanism is provided for improving single-thread performance for a multi-threaded, in-order processor core. In a first phase, a compiler analyzes application code to identify instructions that can be executed in parallel with focus on instruction-level parallelism and removing any register interference between the threads. The compiler inserts as appropriate synchronization instructions supported by the apparatus to ensure that the resulting execution of the threads is equivalent to the execution of the application code in a single thread. In a second phase, an operating system schedules the threads produced in the first phase on the hardware threads of a single processor core such that they execute simultaneously. In a third phase, the microprocessor core executes the threads specified by the second phase such that there is one hardware thread executing an application thread.

20 Claims, 4 Drawing Sheets

```
100d20b0:    li     r0, 0                       cycle 1

100d20b4:    stb    r0, 64(r30)                 cycle 9
100d20b8:    ld     r9, 16(r31)                 cycle 17
100d20bc:    ld     r11, 8(r31)                 cycle 25
100d20c0:    lwa    r25, 32(r31)                cycle 33
100d20c4:    ld     r3, 0(r9)                   cycle 41
100d20c8:    lwa    r27, 32(r11)                cycle 49
100d20cc:    lwa    r28, 16(r9)                 cycle 57
100d20d0:    bl     10088070 <._init+0x2970>    cycle 65
```

```
Thread 1                                Thread 2

100d20b0:   li    r0, 0
cycle 1
                                        ld    r9, 16(r31)
                                        cycle 2
100d20b4:   stb   r0, 64(r30)
cycle 9
                                        ld    r11, 8(r31)
                                        cycle 10
100d20b8:   lwa   r25, 32(r31)
cycle 17
                                        ld    r3, 0(r9)
                                        cycle 18
100d20bc:   lwa   r27, 32(r11)
cycle 25
                                        lwa   r28, 16(r9)
                                        cycle 26
100d20c0:   sync
cycle 33
                                        sync
                                        cycle 34
100d20c4:   bl    10088070 <.__init+0x2970>
cycle 41
                                        bl    10088070 <.__init+0x2974>
                                        cycle 42
```

SINGLE THREAD PERFORMANCE IN AN IN-ORDER MULTI-THREADED PROCESSOR

BACKGROUND

The present application relates generally to an improved data processing apparatus and method and more specifically to the design of multithreaded microprocessors.

Modern microprocessors are designed out of complementary metal oxide semiconductor (CMOS) technology, which has heretofore obeyed the Moore's conjecture, which predicted that the number of transistors within a given chip area would double roughly every 18 months. This doubling comes from predictable and continuous improvement, in lithography that allows the mask of a CMOS chip to improve in resolution by a factor of two every 18 months. Microprocessor design has benefited greatly from this progress, which has translated over the years to improved processor performance as smaller transistors allow faster switching, which in turn allows the processor to run at increasing frequency.

Furthermore, designers have used techniques that allow a processor to execute instructions of a program in a different order than the one specified in the application code. This mode, called out-of-order processing, enables processors to extract more performance than was possible by just exploiting frequency improvement. In its simplest mode, the hardware examines a plurality of instructions that are about to run on the processor, and executes as many of them in parallel as far as it can determine that the resulting execution would be equivalent to a sequential execution of the code. This enables the processor to extract instruction-level parallelism (ILP) from application code, resulting in improved performance at the expense of complexity in processor design and more power consumption.

The technique was refined further to include speculative execution, in which the processor would speculatively execute instructions further down the stream in the hope that prior instructions in flight would not violate the equivalence to a sequential execution (e.g., branch prediction, pre fetch data, etc.). If the speculative assumptions hold, the result is faster execution as more instructions are executed per unit of time, whereas if the speculative assumptions turn out to be invalid, the results of the speculation are simply discarded. These techniques exploit all possible avenues to improve performance of a single-thread application at the expense of more complexity and power consumption.

Recently, however, it has become difficult to harness additional frequency increases due to transistor miniaturization, as the resulting heat dissipated by a transistor at higher frequency becomes too concentrated in such a small area that it cannot be removed effectively. As a result, the frequency growth of microprocessors has reached a limit, and designers have resorted to using the additional devices on the processor chip to increase the number of processor cores, compensating for the limited speed of a single core by providing more cores. Additionally, designers have resorted to increasing the number of hardware threads that run in each core, again compensating for the limited speed of a single core by providing more contexts within the core to run additional application codes.

Additionally, techniques for speculative executions, and the power overhead necessary to identify ILP also added to the power consumption of the processor. These techniques have become unattractive because of the limited ability to supply power to a single chip due to the physical characteristics of the power supply connections, and the decreasing ability to remove heat concentrated in smaller and smaller devices. These limitations have driven processor designers to focus on simpler cores that run instructions in order of the sequential code specified by the application. These cores, typically called in-order cores, are usually simple in design, consume less power, and are unable to exploit ILP. The designers have compensated for these limitations by increasing the number of threads per core and the number of cores per processor chip.

Increasing the number of cores and the number of threads in a core is beneficial for applications that show natural parallelism, such as throughput-oriented workloads (e.g., Web servers). However, the performance of legacy application code and applications that are not amenable to parallelization cannot benefit from multi-core or multi-threaded processors. These applications have traditionally enjoyed improved performance by relying on the processor design to extract ILP, and on frequency increase, to run applications faster. Such features are no longer dependable due to limited power consumption and heat extraction as mentioned above, and thus single-threaded applications cannot benefit from newer processors. These newer processors are designed for low power consumption and benefit throughput-oriented applications, at the expense of single-thread performance. Therefore, there is a need for a method to allow single-threaded applications to benefit from newer multi-core and multithreaded processors that have limited single thread performance.

SUMMARY

In one illustrative embodiment, a method is provided in a data processing system for improving single-thread performance in an in-order multi-threaded processor core. The method comprises receiving, by a compiler executing on one or more processors in the data processing system, single-threaded application code, analyzing, by the compiler, the single-threaded application code to identify instructions that can be executed in parallel, and generating, by the compiler, multi-threaded application code. The multi-threaded application code comprising a plurality of threads that execute the instructions that can be executed in parallel in separate threads. The method further comprises storing the multi-threaded application code in a memory of the data processing system and outputting the multi-threaded application code to be executed in the in-order multi-threaded processor. The in-order multi-threaded processor core operates in a special mode in which a register file of a first thread within the plurality of threads is shared by all threads executing the multi-threaded application code.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for improving single-thread performance of a multithreaded in-order processor core. According to the illustrative embodiments, a compiler extracts instruction-level parallelism (ILP) from application code by analyzing the code and determining which instructions can be executed on different threads in parallel with a first thread. The compiler decides the number of threads and resulting code for each thread. Additionally, the compiler inserts synchronization (sync) instructions to ensure that the threads remain in sync and that the execution of all threads will be equivalent to a sequential execution of the application code by a single thread. Further, according to the illustrative embodiments, an operating system schedules the threads belonging to the same application which were the output of the compiler unto a single, multithreaded core such that each application thread runs on a given hardware thread. Moreover, according to the illustrative embodiments, the processor core operates in a special mode in which the register file of a first thread is shared by all threads executing the application program. The register file of the first thread will contain the values that would otherwise be computed by running the original, sequential application code in a single thread.

In the following detailed description of example embodiments of the invention, specific example embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology used to describe the components/devices/parameters herein, without limitation. Each term used herein is to be given its broadest interpretation given the context in which that term is used.

Figure 1:
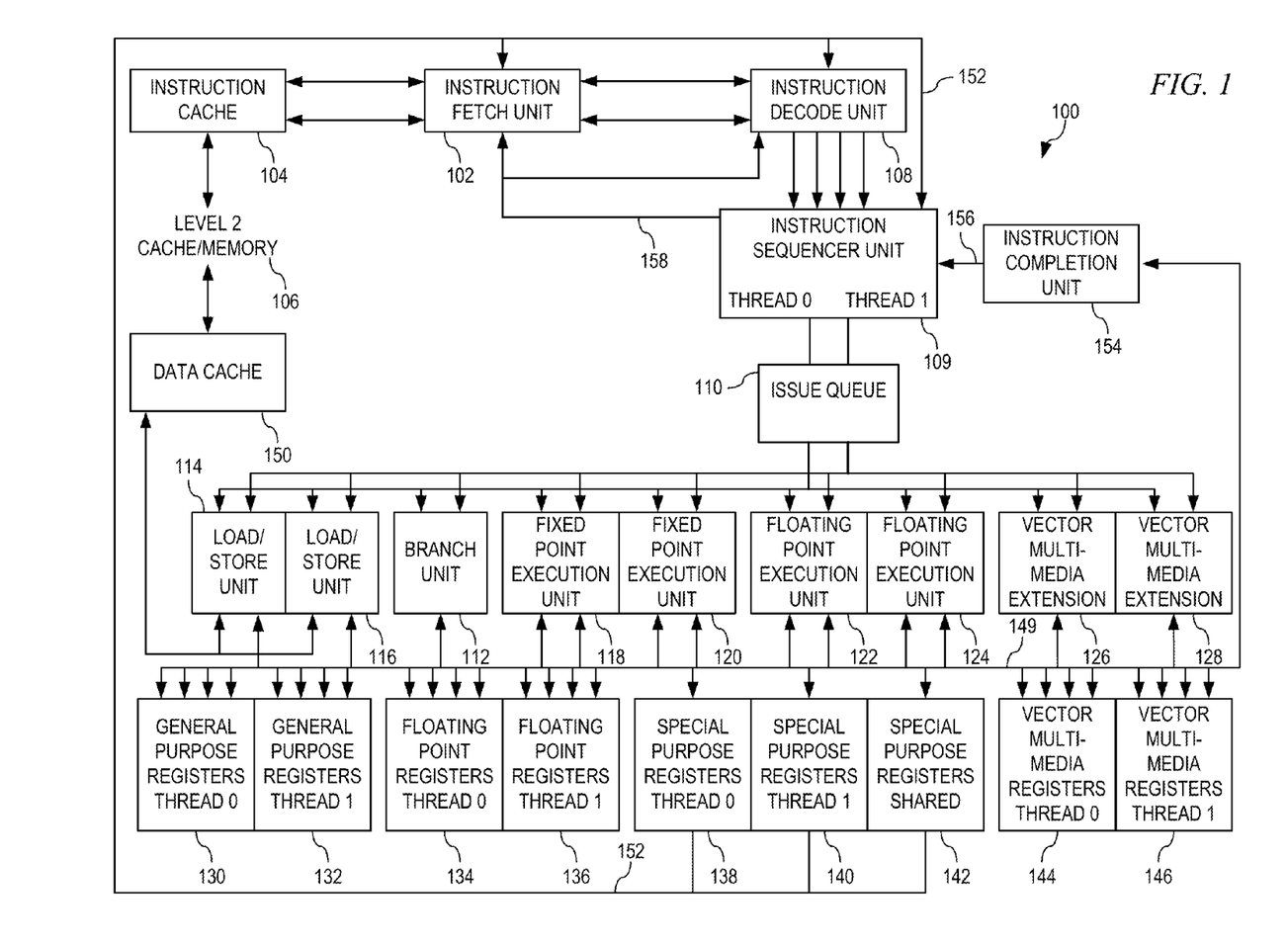
FIG. 1 is an example block diagram of a conventional dual threaded processor design showing functional units and registers in which aspects of the illustrative embodiments may be implemented.

With reference now to the figures and in particular with reference to FIG. 1, an example diagram of a data processing environment is provided in which illustrative embodiments of the present invention may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

FIG. 1 is an example block diagram of a conventional dual threaded processor design showing functional units and registers in which aspects of the illustrative embodiments may be implemented. Processor 100 comprises a single integrated circuit superscalar microprocessor with dual-thread simultaneous multi-threading (SMT) that may also be operated in a single threaded mode. Accordingly, as discussed further herein below, processor 100 includes various units, registers, buffers, memories, and other sections, all of which are formed by integrated circuitry.

As shown in FIG. 1, instruction fetch unit (IFU) 102 connects to instruction cache 104. Instruction cache 104 holds instructions for multiple programs (threads) to be executed. Instruction cache 104 also has an interface to level 2 (L2) cache/memory 106. IFU 102 requests instructions from instruction cache 104 according to an instruction address, and passes instructions to instruction decode unit 108. In an example embodiment. IFU 102 may request multiple instructions from instruction cache 104 for up to two threads at the same time. Instruction decode unit 108 decodes multiple instructions for up to two threads at the same time and passes decoded instructions to instruction sequencer unit (ISU) 109.

Processor 100 may also include issue queue 110, which receives decoded instructions from ISU 109. Instructions are stored in the issue queue 110 while awaiting dispatch to the appropriate execution units. For an in-order processor, issue queue 110 issues the instructions in order for each thread, and outputs or issues instructions for each thread to execution units 112, 114, 116, 118, 120, 122, 124, 126, and 128 of the processor. This process will be described in more detail in the following description.

In an illustrative embodiment, the execution units of the processor may include branch unit 112, load/store units (LSUA) 114 and (LSUB) 116, fixed point execution units (FXUA) 118 and (FXUB) 120, floating point execution units (FPUA) 122 and (FPUB) 124, and vector multimedia extension units (VMXA) 126 and (VMXB) 128. Execution units 112, 114, 116, 118, 120, 122, 124, 126, and 128 are fully shared across both threads, meaning that execution units 112, 114, 116, 118, 120, 122, 124, 126, and 128 may receive instructions from either or both threads. The processor includes multiple register sets 130, 132, 134, 136, 138, 140, 142, 144, and 146, which may also be referred to as architected register files (ARFs).

An ARF is a file where completed data is stored once an instruction has completed execution. ARFs 130, 132, 134, 136, 138, 140, 142, 144, and 146 may store data separately for each of the two threads and by the type of instruction, namely general purpose registers (GPRs) 130 and 132, floating point registers (FPRs) 134 and 136, special purpose registers (SPRs) 138 and 140, and vector registers (VRs) 144 and 146. Separately storing completed data by type and by thread assists in reducing processor contention while processing instructions.

The processor additionally includes a set of shared special purpose registers (SPR) 142 for holding program states, such as an instruction pointer, stack pointer, or processor status word, which may be used on instructions from either or both threads. Execution units 112, 114, 116, 118, 120, 122, 124, 126, and 128 are connected to ARFs 130, 132, 134, 136, 138, 140, 142, 144, and 146 through simplified internal bus structure 149.

In order to execute a floating point instruction, FPUA 122 and FPUB 124 retrieves register source operand information, which is input data required to execute an instruction, from FPRs 134 and 136, if the instruction data required to execute the instruction is complete or if the data has passed the point of flushing in the pipeline. Complete data is data that has been generated by an execution unit once an instruction has completed execution and is stored in an ARF, such as ARFs 130, 132, 134, 136, 138, 140, 142, 144, and 146. Incomplete data is data that has been generated during instruction execution where the instruction has not completed execution. FPUA 122 and FPUB 124 input their data according to which thread each executing instruction belongs to. For example, FPUA 122 inputs completed data to FPR 134 and FPUB 124 inputs completed data to FPR 136, because FPUA 122, FPUB 124, and FPRs 134 and 136 are thread specific.

During execution of an instruction, FPUA 122 and FPUB 124 output their destination register operand data, or instruction data generated during execution of the instruction, to FPRs 134 and 136 when the instruction has passed the point of flushing in the pipeline. During execution of an instruction, FXUA 118, FXUB 120, LSUA 114, and LSUB 116 output their destination register operand data, or instruction data generated during execution of the instruction, to GPRs 130 and 132 when the instruction has passed the point of flushing in the pipeline. During execution of a subset of instructions, FXUA 118, FXUB 120, and branch unit 112 output their destination register operand data to SPRs 138, 140, and 142 when the instruction has passed the point of flushing in the pipeline. Program states, such as an instruction pointer, stack pointer, or processor status word, stored in SPRs 138 and 140 indicate thread priority 152 to ISU 109. During execution of an instruction, VMXA 126 and VMXB 128 output their destination register operand data to VRs 144 and 146 when the instruction has passed the point of flushing in the pipeline.

Data cache 150 may also have associated with it a non-cacheable unit (not shown) which accepts data from the processor and writes it directly to level 2 cache/memory 106. In this way, the non-cacheable unit bypasses the coherency protocols required for storage to cache.

In response to the instructions input from instruction cache 104 and decoded by instruction decode unit 108, ISU 109 selectively dispatches the instructions to issue queue 110 and then onto execution units 112, 114, 116, 118, 120, 122, 124, 126, and 128 with regard to instruction type and thread. In turn, execution units 112, 114, 116, 118, 120, 122, 124, 126, and 128 execute one or more instructions of a particular class or type of instructions. For example, FXUA 118 and FXUB 120 execute fixed point mathematical operations on register source operands, such as addition, subtraction, ANDing, ORing, and XORing. FPUA 122 and FPUB 124 execute floating point mathematical operations on register source operands, such as floating point multiplication and division. LSUA 114 and LSUB 116 execute load and store instructions, which move operand data between data cache 150 and ARFs 130, 132, 134, and 136. VMXA 126 and VMXB 128 execute single instruction operations that include multiple data. Branch unit 112 executes branch instructions which conditionally alter the flow of execution through a program by modifying the instruction address used by IFU 102 to request instructions from instruction cache 104.

Instruction completion unit 154 monitors internal bus structure 149 to determine when instructions executing in execution units 112, 114, 116, 118, 120, 122, 124, 126, and 128 are finished writing their operand results to ARFs 130, 132, 134, 136, 138, 140, 142, 144, and 146. Instructions executed by branch unit 112, FXUA 118, FXUB 120, ISUA 114, and LSUB 116 require the same number of cycles to execute, while instructions executed by FPUA 122, FPUB 124, VMXA 126, and VMXB 128 require a variable, and a larger number of cycles to execute. Therefore, instructions that are grouped together and start executing at the same time do not necessarily finish executing at the same time. "Completion" of an instruction means that the instruction is finishing executing in one of execution units 112, 114, 116, 118, 120, 122, 124, 126, or 128, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 154 monitors for the completion of instructions, and sends control information 156 to ISU 109 to notify ISU 109 that more groups of instructions can be dispatched to execution units 112, 114, 116, 118, 120, 122, 124, 126, and 128. ISU 109 sends dispatch signal 158, which serves as a throttle to bring more instructions down the pipeline to the dispatch unit, to IFU 102 and instruction decode unit 108 to indicate that it is ready to receive more decoded instructions. While processor 100 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

Figure 2:
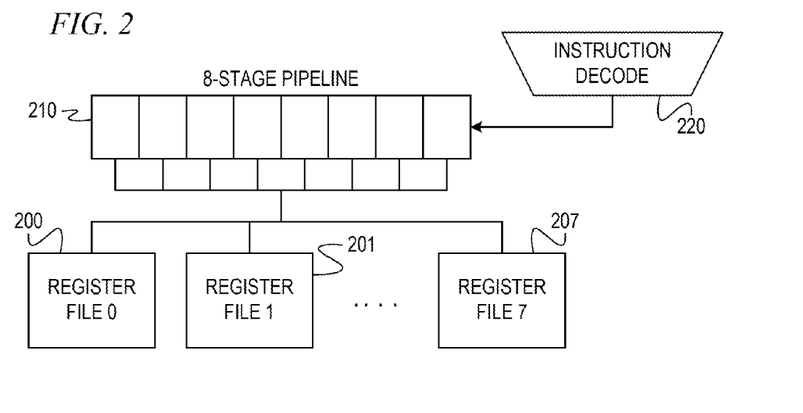
FIG. 2 is a block diagram representation of multithreaded processor core according to an illustrative embodiment.

FIG. 2 is a block diagram representation of multithreaded processor core according to an illustrative embodiment. In the depicted example, the processor core supports eight hardware threads. Each hardware thread has a corresponding register file. Thus, register file 0 200 corresponds to thread 0, register file 1 201 corresponds to thread 1, and so on up to register thread 7 207 corresponding to thread 7. An eight-stage pipeline 210 includes the various processing elements of the processor such as Arithmetic Logical Unit (ALU), Floating Point Unit (FPU), etc. The pipeline is fed from an instruction decode unit 220 and uses the register files 200 through 207 to obtain operands and save results. The design of the pipeline is such that one stage of the pipeline can finish its operation in one clock cycle. The eight threads are scheduled in strict round-robin order, such that at any given cycle, the pipeline contains the eight threads at different stages.

For example, at cycle 8, thread 0 is at stage 0, thread 1 is at stage 7, thread 2 is at stage 6, and so on. In the next cycle, thread 0 is at stage 1, thread 1 is at stage 0, thread 2 is at stage 7, and so on. Thus, it takes one thread eight cycles to complete an instruction under the best of circumstances. The core executes as if it is running a single instruction per cycle in aggregate. This design is different from conventional out-of-order (OOO) processors in that no single thread can be at two or more stages of the pipeline. Additionally, the design stipulates that no register is written until stage 7 (the last pipeline stage). This way, instructions can be aborted without producing any side effects, if necessary. An instruction may be aborted in two cases: 1) when conditional branches are resolved, in which case the thread has to restart from stage 0 of the pipeline (when its turn on stage 0 comes); and 2) when a cache read operation fails to get the data because of a cache miss (in which case the thread is postponed until its next turn on the stage). The design stipulates also that stage 3 is the one at which conditional branches are resolved and cache loads are obtained, and that by stage 3 all reads of register operands necessary to carry out the operation would have been loaded.

Under normal operation, the processor core has eight simultaneous threads running. All share the pipeline in the manner described. This mode of operation is excellent for throughput-oriented workloads and applications that can be parallelized by the programmer. The eight-stage pipeline including the necessary feedbacks can be implemented with relatively small area and excellent power consumption. However, since every instruction takes 8 cycles to complete, it is clear that this design does not offer good single thread performance.

Figure 3:
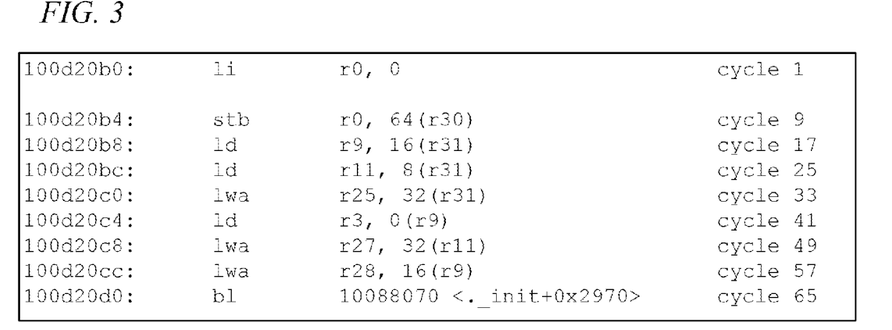
FIG. 3 shows an example program according to an illustrative embodiment.

FIG. 3 shows an example program according to an illustrative embodiment. The sample code consists of nine instructions that belong to a single thread. As the example shows, the first instruction completes at cycle I. Eight cycles later, the second instruction completes, and so on, with each instruction completion separated by eight cycles. In the example, the sample code completes by the 65th cycle.

Figure 4:
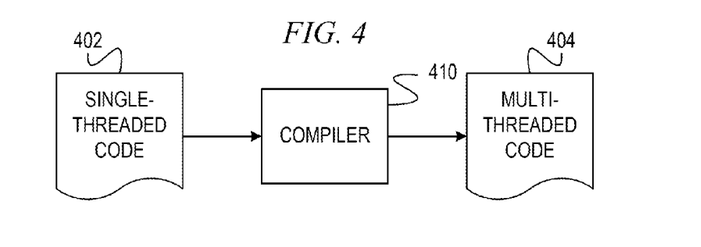
FIG. 4 is a block diagram illustrating a compiler for improving single-threaded performance in an in-order multithreaded processor in accordance with an illustrative embodiment.
Figure 5:
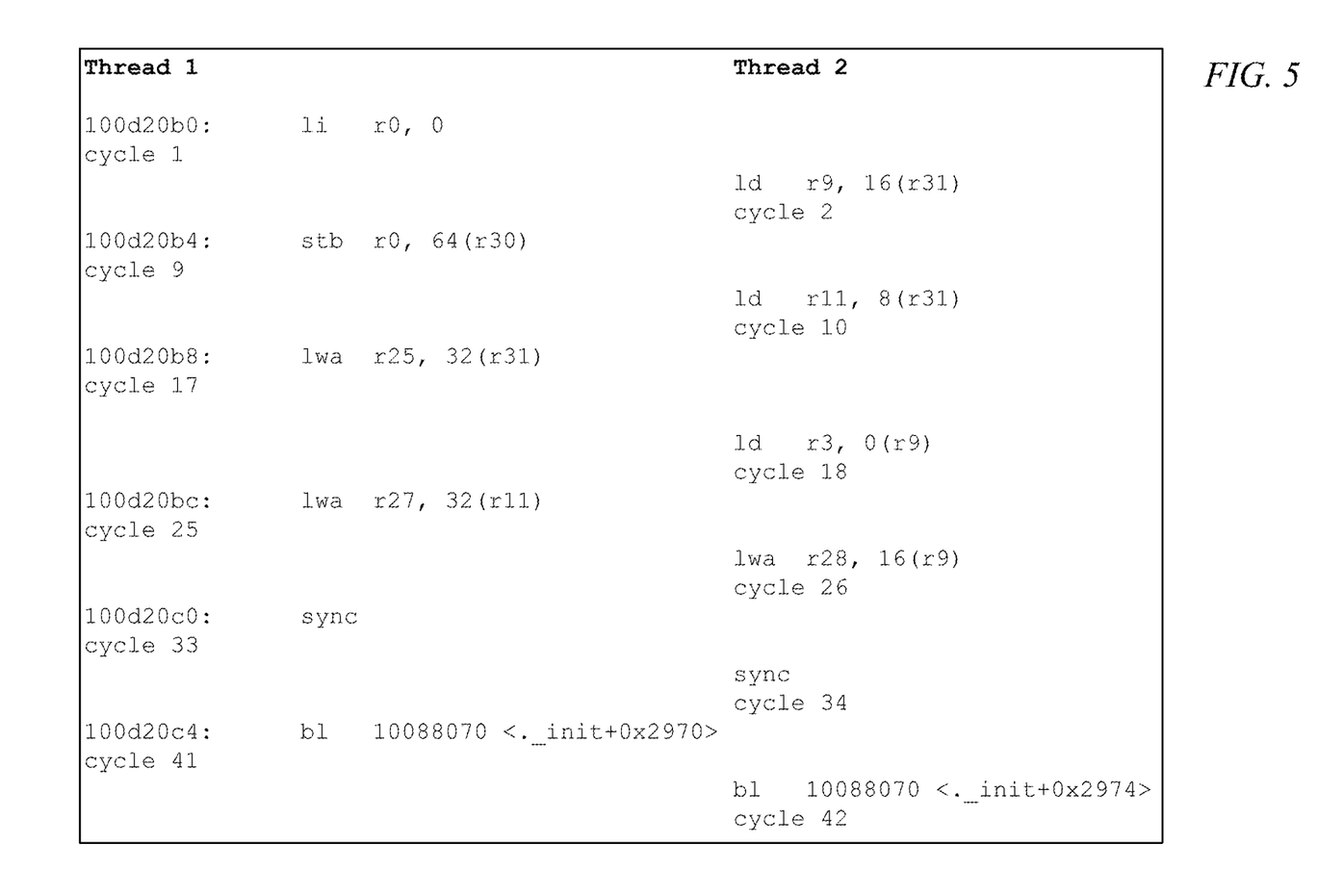
FIG. 5 shows an example multi-threaded program in accordance with an illustrative embodiment.

FIG. 4 is a block diagram illustrating a compiler for improving single-threaded performance in an in-order multi-threaded processor in accordance with an illustrative embodiment. To improve performance, compiler 410 analyzes single-threaded code 402, such as the sample code shown in FIG. 3, looking for instructions that can be interleaved in parallel. Thus, in this invention, ILP is decided at compile time instead of by the hardware at run time. Compiler 410 then generates multi-threaded code 404. FIG. 5 shows an example multi-threaded program in accordance with an illustrative embodiment.

As seen in FIG. 5, compiler 410 has determined that the original single-thread stream of instructions can be broken into two threads, where the instructions within one thread do not interfere with the other thread. Among the criteria for interference is the use of the register value written by the other thread, or reading an item from the cache written by the other thread, or writing an item to the cache that would overwrite a value to be read by the other thread. The resulting two threads in FIG. 5, for example, do not have any of these interferences.

Because the sample code completes with a branch instruction, the two produced threads must be synchronized before proceeding to the branch instructions. This example shows only two threads by way of example to simplify the description. Those skilled in the art may appreciate that the concept extends to more than two threads.

However, running the two threads shown in FIG. 5 in two independent hardware threads may not be advantageous. First, the registers must be copied from the first thread's register file to the other before the threads can start. Second, the execution snippet is very short, four instructions per thread. This is too short to justify the context switching required to start the second thread and the associated operating system overhead. Instead, the embodiment according to this invention introduces two new features to the processor. First, the sync instruction is introduced to block progress of the calling thread until all the threads running within the same application would reach the same synchronization. The hardware according to the illustrative embodiment thus provides for a very fast barrier instruction that enables all threads belonging to the application to adjust their progress without introducing the overhead of a context switch or an operating system supported synchronization primitive.

Second, the processor core according to the illustrative embodiment introduces a new mode of operation in which all threads use register file 0. This is possible because all accesses to registers by the threads do not interfere with the accesses by other threads. Thus, the actual registers may be used safely within one register file. This obviates the need to copy registers between register files which would have wasted power and reduced performance further.

To support this operation, the operating system scheduler must be modified in the following manner. For applications that were processed by the compiler, such as shown in FIG. 5, for example, the operating system scheduler must schedule the various threads belonging to the application simultaneously. Additionally, the operating system must set the processor mode such that all threads belonging to the application will use the same register file. It is beneficial, though not necessary, that all threads are context switched out and in simultaneously. These modifications are simple in an operating system that supports gang scheduling.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
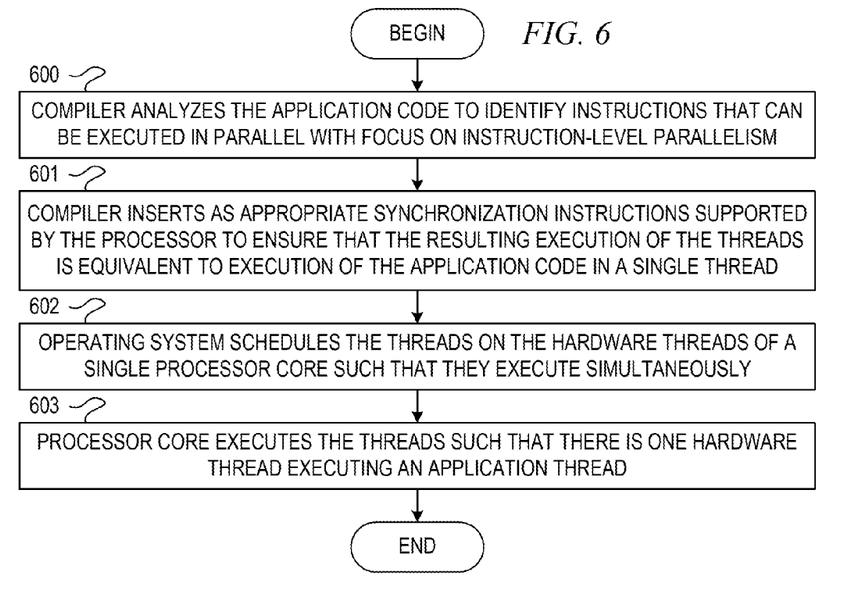
FIG. 6 is a flowchart illustrating operation, of a mechanism for improving single-thread performance for a multithreaded, in-order processor core in accordance with an illustrative embodiment.

FIG. 6 is a flowchart illustrating operation of a mechanism for improving single-thread performance for a multi-threaded, in-order processor core in accordance with an illustrative embodiment. Operation begins, and in a first phase, a compiler analyzes the application code to identify instructions that can be executed in parallel with focus on instruction-level parallelism (ILP) (block 600). The output of the first phase is a number of execution threads corresponding to the maximum level of parallelism that was detected by analyzing the application code, not to exceed the number of threads in a single core, and a corresponding application code for each thread. Additionally, the compiler inserts as appropriate synchronization (sync) instructions supported by the apparatus to ensure that the resulting execution of the threads is equivalent to the execution of the application code in a single thread (block 601), in a second phase, an operating system schedules the threads produced in the first phase on the hardware threads of a single processor core such that they execute simultaneously (block 602). In a third phase, the processor core executes the threads specified by the second phase such that there is one hardware thread executing an application thread (block 603). Thereafter, operation ends. The processor in this case operates in a mode of operation in which all said threads within the processor cores share the register file of a single thread, and use synchronization instructions to ensure that threads stop at execution points specified by the compiler in the first phase. The result is an equivalent execution to a single thread performance in logical results, but with a faster execution time due to the exploitation of ILP by the various threads.

Figure 7:
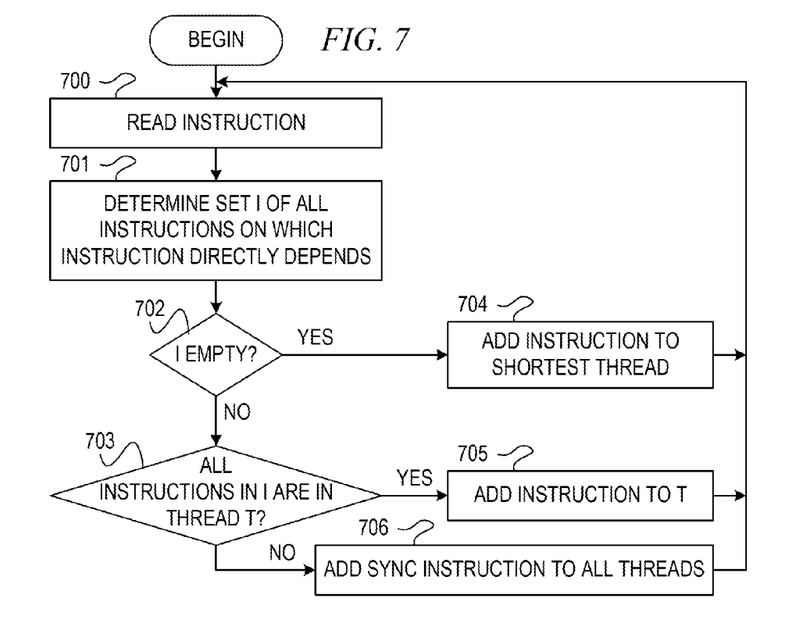
FIG. 7 is a flowchart illustrating operation of determining how to split a sequential thread into multiple threads that exploit instruction-level parallelism.

FIG. 7 is a flowchart illustrating operation of determining how to split a sequential thread into multiple threads that exploit instruction-level parallelism (ILP). First, the instruction is read into a variable (block 700). Then, the compiler decides which of the previous instructions produces a result on which instruction depends (block 701). In the example shown in FIG. 3, the second instruction depends on the first one, whereas the third instruction depends on neither.

The compiler determines whether the set of instructions that produces a result on which the current instruction depends is empty (block 702). If so, the compiler is free to add this instruction to any of the threads, and thus in the illustrative embodiment compiler adds the current instruction to the thread with the fewest number of assigned instructions (block 704), and operation returns to block 700 to read the next instruction. In the example shown in FIG. 3, the third instruction depends on no other instruction in the set, in which case it is added to the thread with the shortest number of instructions assigned (the second thread).

If the compiler determines that the set of instructions that produces a result on which the current instruction depends is not empty, the compiler determines whether the instructions are in the same thread, T (block 703). If so, the compiler assigns the current instruction to join its predecessors in the corresponding thread (block 705), and operation returns to block 700 to read the next instruction. In the example of FIG. 3, the second instruction is shown to have its dependent in the first thread, and therefore it is added to that thread.

If the compiler determines that the set of instructions that produce a result on which the current instruction depends are not in the same thread in block 703, the compiler declares that the current phase is over by adding synchronization (sync)

instructions to all threads (block 706), and operation returns to block 700 to read the next instruction.

The example in FIGS. 3 and 5 shows that when a branch instruction is encountered, a sync instruction is added to all threads (this is not shown in the flow chart of FIG. 7 to simplify the presentation). The same applies to all control flow instructions such as return from subroutine, conditional branches, and subroutine calls. Note also that it is possible to optimize the flowchart in FIG. 7 to postpone the addition of sync instructions in block 706, for example, by reordering instructions in a mariner that include subsequent instructions that may not force the sync instructions to be added.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for improving single-thread performance for a multi-threaded, in-order processor core. In a first phase, a compiler analyzes the application code to identify instructions that can be executed in parallel with focus on instruction-level parallelism (ILP). The output of the first phase is a number of execution threads corresponding to the maximum level of parallelism that was detected by analyzing the application code, not to exceed the number of threads in a single core, and a corresponding application code for each thread. Additionally, the compiler inserts as appropriate synchronization instructions supported by the apparatus to ensure that the resulting execution of the threads is equivalent to the execution of the application code in a single thread. In a second phase, an operating system schedules the threads produced in the first phase on the hardware threads of a single processor core such that they execute simultaneously. In a third phase, the microprocessor core executes the threads specified by the second phase such that there is one hardware thread executing an application thread. The processor in this case operates in a mode of operation in which all said threads within the processor cores share the register file of a single thread, and use synchronization instructions to ensure that threads stop at execution points specified by the compiler in the first phase. The result is an equivalent execution to a single thread performance in logical results, but with a faster execution time due to the exploitation of ILP by the various threads.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc., or any suitable combination thereof.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for improving single-thread performance in an in-order multi-threaded processor core, the method comprising:
   receiving, by a compiler executing on one or more processors in the data processing system, single-threaded application code;
   analyzing, by the compiler, the single-threaded application code to identify, instructions that can be executed in parallel;
   generating, by the compiler, multi-threaded application codes wherein the multi-threaded application code comprising a plurality of threads that execute the instructions that can be executed in parallel in separate threads;
   adding, by the compiler, a synchronization instruction to each thread of the multi-threaded application code to ensure that execution of the plurality of threads is equivalent to execution of the single-threaded application code in a single thread, wherein the in-order multi-threaded processor core supports the synchronization instruction and responsive to a calling thread encountering the synchronization instruction, blocks progress of the calling thread until all threads running within the multi-threaded application code reach the synchronization instruction;
   storing the multi-threaded application code in a memory of the data processing system; and
   outputting the multi-threaded application code to be executed in the in-order multi-threaded processor.

2. The method of claim 1, wherein analyzing the single-threaded application code and generating the multi-threaded application code comprises:
   for each given instruction in the single-threaded application code, determining a set of instructions on which the given instruction directly depends; and
   if the set of instructions is empty, adding the given instruction to a shortest thread in the plurality of threads.

3. The method of claim 2, wherein analyzing the single-threaded application code and generating the multi-threaded application code further comprises:
  if the set of instructions is not empty, determining whether all of the instructions in the set of instructions are in the same thread within the plurality of threads; and
  responsive to all of the instructions in the set of instructions being in the same thread, adding the given instruction to the same thread as the set of instructions.

4. The method of claim 3, wherein analyzing the single-threaded application code and generating the multi-threaded application code further comprises:
  responsive to all of the instructions in the set of instructions not being in the same thread, adding a synchronization instruction to all threads in the plurality of threads.

5. The method of claim 1, wherein the in-order multi-threaded processor core operates in a special mode in which a register file of a first thread within the plurality of threads is shared all threads executing the multi-threaded application code.

6. The method of claim 1, wherein executing the multi-threaded application code in the in-order multi-threaded processor core comprises:
  scheduling, by an operating system, the plurality of threads on hardware threads of the in-order multi-threaded processor such that they execute simultaneously.

7. The method of claim 1, wherein executing the multi-threaded application code m the in-order multi-threaded processor core comprises:
  executing, by the multi-threaded processor, the multi-threaded application code such that one hardware thread executes an application thread.

8. A computer program product comprising a non-transitory computer readable storage medium having a computer readable program stored therein, wherein the computer readable program, when executed on a computing device, causes the computing device to:
  receive, by a compiler executing on one or more processors in the computing device, single-threaded application code;
  analyze, by the compiler, the single-threaded application code to identify instructions that can be executed in parallel;
  generate, by the compiler, multi-threaded application code, wherein the multi-threaded application code comprising a plurality of threads that execute the instructions that can be executed in parallel in separate threads;
  add, by the compiler, a synchronization instruction to each thread of the multi-threaded application code to ensure that execution of the plurality of threads is equivalent to execution of the single-threaded application code in a single thread, wherein the in-order multi-threaded processor core supports the synchronization instruction and responsive to a calling thread encountering the synchronization instruction, blocks progress of the calling thread until all threads running within the multi-threaded application code reach the synchronization instruction;
  store the multi-threaded application code in a memory of the computing device; and
  output the multi-threaded application code to be executed in the in-order multi-threaded processor.

9. The computer program product of claim 8, wherein analyzing the single-threaded application code and generating the multi-threaded application code comprises:
  for each given instruction in the single-threaded application code, determining a set of instructions on which the given instruction directly depends; and
  if the set of instructions is empty, adding the given instruction to a shortest thread in the plurality of threads.

10. The computer program product of claim 9, wherein analyzing the single-threaded application code and generating the multi-threaded application code further comprises:
  if the set of instructions is not empty, determining whether all of the instructions in the set of instructions are in the same thread within the plurality of threads; and
  responsive to all of the instructions in the set of instructions being in the same thread, adding the given instruction to the same thread as the set of instructions.

11. The computer program product of claim 10, wherein analyzing the single-threaded application code and generating the multi-threaded application code further comprises:
  responsive to all of the instructions in the set of instructions not being in the same thread, adding a synchronization instruction to all threads in the plurality of threads.

12. The computer program product of claim 8, wherein the in-order multi-threaded processor core operates in a special mode in which a register file of a first thread within the plurality of threads is shared by all threads executing the multi-threaded application code.

13. The computer program product of claim 8, wherein the computer readable program is stored in a computer readable storage medium in a data processing system and wherein the computer readable program was downloaded over a network from a remote data processing system.

14. The computer program product of claim 8, wherein the computer readable program is stored in a computer readable storage medium in a server data processing system and wherein the computer readable program is downloaded over a network to a remote data processing system for use in a computer readable storage medium with the remote system.

15. An apparatus, comprising:
  one or more processor; and
  a memory coupled to the one or more processors, wherein the memory comprises instructions which, when executed by the one or more processors, cause the one or more processors to:
  receive, by a compiler executing on the one or more processors, single-threaded application code;
  analyze, by the compiler, the single-threaded application code to identify instructions that can be executed in parallel;
  generate, by the compiler, multi-threaded application code, wherein the multi-threaded application code comprising a plurality of threads that execute the instructions that can be executed in parallel in separate threads;
  add, by the compiler, a synchronization instruction to each thread of the multi-threaded application code to ensure that execution of the plurality of threads is equivalent to execution of the single-threaded application code in a single thread, wherein the in-order multi-threaded processor core supports the synchronization instruction and responsive to a calling thread encountering the synchronization instruction, blocks progress of the calling thread until all thread running within the multi-threaded application code reach the synchronization instruction;
  store the multi-threaded application code in the memory; and
  output the multi-threaded application code to be executed in the in-order multi-threaded processor.

16. The apparatus of claim 15, wherein analyzing the single-threaded application code and generating the multi-threaded application code comprises:

for each given instruction in the single-threaded application code, determining a set of instructions on which the given instruction directly depends; and if the set of instructions is empty, adding the given instruction to a shortest thread in the plurality of threads.

17. The apparatus of claim 16, wherein analyzing the single-threaded application code and generating the multi-threaded application code further comprises:

if the set of instruction is not empty, determining whether all of the instructions in the set of instructions are in the same thread within the plurality of threads; and responsive to all of the instructions in the set of instructions being in the same thread, adding the given instruction to the same thread as the set of instructions.

18. The apparatus of claim 17, wherein analyzing the single-threaded application code and generating the multi-threaded application code further comprises:

responsive to all of the instructions in the set of instructions not being in the same thread, adding a synchronization instruction to all threads in the plurality of threads.

19. The apparatus of claim 15, wherein the in-order multi-threaded processor core operates in a special mode in which a register file of a first thread within the plurality of threads is shared by all threads executing the multi-threaded application code.

20. The apparatus of claim 15, wherein the instructions further cause the one or more processors to:

schedule, by an operating system, the plurality of threads on hardware threads of the in-order multi-threaded processor such that they execute simultaneously.

* * * * *